(12) United States Patent
Baur (10) Patent No.: US 7,813,023 B2
(45) Date of Patent: Oct. 12, 2010

(54) ELECTRO-OPTIC MIRROR

(75) Inventor: Michael J. Baur, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 24 days.

(21) Appl. No.: 12/480,331

(22) Filed: Jun. 8, 2009

(65) Prior Publication Data

US 2009/0303564 A1    Dec. 10, 2009

Related U.S. Application Data (60) Provisional application No. 61/059,945, filed on Jun. 9, 2008.

(51) Int. Cl.
*G02F 1/03* (2006.01)

(52) U.S. Cl. ..................................... 359/263

(58) Field of Classification Search ................ 359/263, 359/265–275, 296, 245, 237, 238, 838; 362/494; 345/107, 105
See application file for complete search history.

(56) References Cited

U.S. PATENT DOCUMENTS

| | | | |
|---|---|---|---|
| 2,263,382 A | 11/1941 | Gotzinger |
| 2,580,014 A | 12/1951 | Gazda |
| 3,266,016 A | 8/1966 | Maruyama et al. |
| 3,280,701 A | 10/1966 | Donnelly et al. |
| 4,435,042 A | 3/1984 | Wood et al. |
| 4,436,371 A | 3/1984 | Wood et al. |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,679,906 A | 7/1987 | Brandenburg |
| 4,712,879 A | 12/1987 | Lynam et al. |
| 4,721,364 A | 1/1988 | Itoh et al. |
| 4,764,410 A | 8/1988 | Grzywinski |
| 4,766,023 A | 8/1988 | Lu |
| 4,773,740 A | 9/1988 | Kawakami et al. |
| 4,793,690 A | 12/1988 | Gahan et al. |
| 4,799,768 A | 1/1989 | Gahan |

(Continued)

FOREIGN PATENT DOCUMENTS

EP    0356099 A2    2/1990

(Continued)

*Primary Examiner*—Timothy J Thompson
*Assistant Examiner*—Tuyen Q Tra
(74) *Attorney, Agent, or Firm*—Van Dyke, Gardner, Linn & Burkhart, LLP (57) ABSTRACT

A reflective element assembly for an interior rearview mirror of a vehicle includes front and rear substrates with a perimeter seal that spaces said front substrate from said rear substrate and establishes an interpane cavity therebetween for an electro-optic medium. The front substrate has a first connecting tab that extends outboard from a perimeter edge of the rear substrate and the rear substrate has a second connecting tab that extends outboard from a perimeter edge of the front substrate. The first and second connecting tabs may extend partially along the same perimeter edge region of the reflective element assembly or along adjacent perimeter edge regions of the reflective element assembly. The first and second connecting tab facilitate electrical connection to the transparent conductive coating of the second surface of the front substrate and the conductive coating of the third surface of the rear substrate, respectively.

16 Claims, 4 Drawing Sheets

U.S. PATENT DOCUMENTS

| | | |
|---|---|---|
| 4,824,221 A | 4/1989 | Endo et al. |
| 4,826,289 A | 5/1989 | Vandenbrink et al. |
| 4,882,466 A | 11/1989 | Friel |
| 4,882,565 A | 11/1989 | Gallmeyer |
| 4,906,085 A | 3/1990 | Sugihara et al. |
| 4,948,242 A | 8/1990 | Desmond et al. |
| 5,014,167 A | 5/1991 | Roberts |
| 5,066,112 A | 11/1991 | Lynam et al. |
| 5,073,012 A | 12/1991 | Lynam |
| 5,076,673 A | 12/1991 | Lynam et al. |
| 5,078,480 A | 1/1992 | Warszawski |
| 5,115,346 A | 5/1992 | Lynam |
| 5,117,346 A | 5/1992 | Gard |
| 5,140,455 A | 8/1992 | Varaprasad et al. |
| 5,142,406 A | 8/1992 | Lampert et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,178,448 A | 1/1993 | Adams et al. |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,207,492 A | 5/1993 | Roberts |
| 5,233,461 A | 8/1993 | Dornan et al. |
| 5,253,109 A | 10/1993 | O'Farrell et al. |
| 5,254,388 A | 10/1993 | Melby et al. |
| 5,285,060 A | 2/1994 | Larson et al. |
| 5,303,322 A | 4/1994 | Winston et al. |
| 5,313,335 A | 5/1994 | Gray et al. |
| 5,327,288 A | 7/1994 | Wellington et al. |
| 5,354,965 A | 10/1994 | Lee |
| 5,355,245 A | 10/1994 | Lynam |
| 5,406,414 A | 4/1995 | O'Farrell et al. |
| 5,437,931 A | 8/1995 | Tsai et al. |
| 5,442,478 A | 8/1995 | Lampert et al. |
| 5,446,576 A | 8/1995 | Lynam et al. |
| 5,481,409 A | 1/1996 | Roberts |
| 5,509,606 A | 4/1996 | Breithaupt et al. |
| 5,523,877 A | 6/1996 | Lynam |
| 5,525,264 A | 6/1996 | Cronin et al. |
| 5,535,056 A | 7/1996 | Caskey et al. |
| 5,550,677 A | 8/1996 | Schofield et al. |
| 5,567,360 A | 10/1996 | Varaprasad et al. |
| 5,575,552 A | 11/1996 | Faloon et al. |
| 5,587,236 A | 12/1996 | Agrawal et al. |
| 5,587,699 A | 12/1996 | Faloon et al. |
| 5,594,222 A | 1/1997 | Caldwell |
| 5,610,756 A | 3/1997 | Lynam et al. |
| 5,649,756 A | 7/1997 | Adams et al. |
| 5,668,663 A | 9/1997 | Varaprasad et al. |
| 5,669,698 A | 9/1997 | Veldman et al. |
| 5,689,370 A | 11/1997 | Tonar et al. |
| 5,724,187 A | 3/1998 | Varaprasad et al. |
| 5,751,489 A | 5/1998 | Caskey et al. |
| 5,786,772 A | 7/1998 | Schofield et al. |
| 5,788,357 A | 8/1998 | Muth et al. |
| 5,790,298 A | 8/1998 | Tonar |
| 5,808,777 A | 9/1998 | Lynam et al. |
| 5,818,636 A | 10/1998 | Leventis et al. |
| 5,877,897 A | 3/1999 | Schofield et al. |
| 5,910,854 A | 6/1999 | Varaprasad et al. |
| 5,922,176 A | 7/1999 | Caskey |
| 5,938,320 A | 8/1999 | Crandall |
| 6,001,486 A | 12/1999 | Varaprasad et al. |
| 6,002,544 A | 12/1999 | Yatsu |
| 6,005,724 A | 12/1999 | Todd |
| 6,065,840 A | 5/2000 | Caskey et al. |
| 6,111,684 A | 8/2000 | Forgette et al. |
| 6,111,685 A | 8/2000 | Tench et al. |
| 6,154,306 A | 11/2000 | Varaprasad et al. |
| 6,164,564 A | 12/2000 | Franco et al. |
| 6,166,847 A | 12/2000 | Tench et al. |
| 6,172,613 B1 | 1/2001 | DeLine et al. |
| 6,178,034 B1 | 1/2001 | Allemand et al. |
| 6,196,688 B1 | 3/2001 | Caskey et al. |
| 6,207,083 B1 | 3/2001 | Varaprasad et al. |
| 6,245,262 B1 | 6/2001 | Varaprasad et al. |
| 6,257,746 B1 | 7/2001 | Todd et al. |
| 6,260,608 B1 | 7/2001 | Kim |
| 6,286,965 B1 | 9/2001 | Caskey et al. |
| 6,310,611 B1 | 10/2001 | Caldwell |
| 6,318,870 B1 | 11/2001 | Spooner et al. |
| 6,320,282 B1 | 11/2001 | Caldwell |
| 6,329,925 B1 | 12/2001 | Skiver et al. |
| 6,356,376 B1 | 3/2002 | Tonar et al. |
| 6,392,783 B1 | 5/2002 | Lomprey et al. |
| 6,420,036 B1 | 7/2002 | Varaprasad et al. |
| 6,428,172 B1 | 8/2002 | Hutzel et al. |
| 6,441,964 B1 | 8/2002 | Chu et al. |
| 6,449,082 B1 | 9/2002 | Agrawal et al. |
| 6,501,387 B2 | 12/2002 | Skiver et al. |
| 6,512,624 B2 | 1/2003 | Tonar et al. |
| 6,595,649 B2 | 7/2003 | Hoekstra et al. |
| 6,615,438 B1 | 9/2003 | Franco et al. |
| 6,627,918 B2 | 9/2003 | Getz et al. |
| 6,642,851 B2 | 11/2003 | DeLine et al. |
| 6,648,477 B2 | 11/2003 | Hutzel et al. |
| 6,669,109 B2 | 12/2003 | Ivanov et al. |
| 6,690,268 B2 | 2/2004 | Schofield et al. |
| 6,710,906 B2 | 3/2004 | Guarr et al. |
| 6,719,215 B2 | 4/2004 | Drouillard |
| 6,737,629 B2 | 5/2004 | Nixon et al. |
| 6,742,904 B2 | 6/2004 | Bechtel et al. |
| D493,131 S | 7/2004 | Lawlor et al. |
| D493,394 S | 7/2004 | Lawlor et al. |
| 6,798,556 B2 | 9/2004 | Tench et al. |
| 6,824,281 B2 | 11/2004 | Schofield et al. |
| 6,831,268 B2 | 12/2004 | Bechtel et al. |
| 7,106,392 B2 | 9/2006 | You |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,310,177 B2 | 12/2007 | McCabe et al. |
| 7,338,177 B2 | 3/2008 | Lynam |
| 7,360,932 B2 | 4/2008 | Uken et al. |
| 7,370,983 B2 | 5/2008 | DeWind et al. |
| 7,391,563 B2 | 6/2008 | McCabe et al. |
| 7,490,007 B2 | 2/2009 | Taylor et al. |
| 7,494,231 B2 | 2/2009 | Varaprasad et al. |
| 7,542,193 B2 | 6/2009 | McCabe et al. |
| 7,543,947 B2 | 6/2009 | Varaprasad et al. |
| 7,633,669 B2 * | 12/2009 | Burrell et al. ............... 359/270 |
| 7,738,155 B2 * | 6/2010 | Agrawal et al. ............. 359/265 |
| 2002/0036828 A1 | 3/2002 | Wong |
| 2002/0159270 A1 | 10/2002 | Lynam et al. |
| 2003/0043589 A1 | 3/2003 | Blank |
| 2003/0101749 A1 | 6/2003 | Lingle et al. |
| 2004/0032638 A1 | 2/2004 | Tonar et al. |
| 2004/0032675 A1 | 2/2004 | Weller et al. |
| 2004/0032676 A1 | 2/2004 | Drummond et al. |
| 2004/0264011 A1 | 12/2004 | Lynam |
| 2005/0078389 A1 | 4/2005 | Kulas et al. |
| 2005/0083577 A1 | 4/2005 | Varaprasad et al. |
| 2005/0099693 A1 | 5/2005 | Schofield et al. |
| 2005/0134983 A1 | 6/2005 | Lynam |
| 2006/0050018 A1 | 3/2006 | Hutzel et al. |
| 2006/0050356 A1 | 3/2006 | Varaprasad et al. |
| 2006/0061008 A1 | 3/2006 | Karner et al. |
| 2006/0126150 A1 | 6/2006 | Tonar et al. |
| 2007/0279752 A1 | 12/2007 | McCabe et al. |
| 2008/0077882 A1 | 3/2008 | Kramer et al. |

| | | | | | | |
|---|---|---|---|---|---|---|
| 2008/0212189 | A1 | 9/2008 | Baur et al. | WO | WO03084780 | 10/2003 |
| 2009/0015736 | A1 | 1/2009 | Weller et al. | WO | WO2004098953 | 11/2004 |
| 2009/0243824 | A1 | 10/2009 | Peterson et al. | WO | WO 2005/062966 | 7/2005 |

FOREIGN PATENT DOCUMENTS

JP  362075619 A  4/1987

* cited by examiner

ELECTRO-OPTIC MIRROR

CROSS REFERENCE TO RELATED APPLICATION

The present application claims benefit of U.S. provisional application Ser. No. 61/059,945, filed Jun. 9, 2008, which is hereby incorporated herein by reference in its entirety.

FIELD OF THE INVENTION

The present invention relates to interior rearview mirror systems of vehicles and, more particularly, to interior rearview mirror systems having variably reflectant electro-optic, such as electrochromic, interior rearview mirror assemblies.

BACKGROUND OF THE INVENTION

Automotive electrochromic mirror reflective element cell assemblies are known and typically include a front substrate and a rear substrate and an electrochromic medium sandwiched therebetween and contained within an interpane cavity. The front substrate typically includes a transparent conductive coating established at its rearward surface (the surface facing the rear substrate and the electrochromic medium) and the rear substrate typically includes a conductive coating (such as a metallic reflector coating or coatings and/or a transparent conductive coating or coatings) established at its front surface (the surface facing the front substrate and the electrochromic medium). Electrical connectors are provided, typically as metallic busbar clips that extend substantially along respective edges of the substrates, to provide electrical current to the conductive coatings to control the dimming or darkening of the electrochromic medium.

SUMMARY OF THE INVENTION

The present invention provides an interior rearview mirror assembly for a vehicle that includes connecting tabs at perimeter edge regions of the mirror substrate for providing enhanced electrical connection to the conductive coatings of the electro-optic reflective element assembly or cell. The connecting tabs allow for enhanced electrical connection and may provide a lower height or profile of the reflective element assembly and of the mirror assembly.

According to an aspect of the present invention, a reflective element assembly for an interior rearview mirror of a vehicle comprises a front substrate having a first surface and a second surface opposite the first surface, and a rear substrate having a third surface and a fourth surface opposite the third surface. The second surface of the front substrate has a transparent conductive layer established thereat and the third surface of the rear substrate has a conductive layer established thereat. A perimeter seal is disposed between the front and rear substrates, with the perimeter seal spacing the front and rear substrates apart and forming an interpane cavity therebetween. An electro-optic medium is disposed in the interpane cavity established between the third surface of the rear substrate and the second surface of the front substrate and bounded by the perimeter seal, and the electro-optic medium contacts the transparent conductive layer at the second surface of the front substrate and the conductive layer at the third surface of the rear substrate. The front substrate has a first cross dimension that is greater than a corresponding cross dimension of the rear substrate so as to establish a first connecting tab of the front substrate, with the first connecting tab extending beyond a corresponding edge region of the rear substrate. The rear substrate has a second cross dimension that is greater than a corresponding cross dimension of the front substrate so as to establish a second connecting tab of the rear substrate, with the second connecting tab extending beyond a corresponding edge region of the front substrate. One of the first and second cross dimensions comprises a generally vertical width dimension of the substrates when the reflective element assembly is normally mounted in a vehicle, and another of the first and second cross dimensions comprises a generally horizontal length dimension of the substrates when the reflective element assembly is normally mounted in a vehicle. The first connecting tab facilitates electrical connection to the transparent conductive coating of the second surface of the front substrate and the second connecting tab facilitates electrical connection to the conductive coating of the third surface of the rear substrate.

According to another aspect of the present invention, a reflective element assembly for an interior rearview mirror of a vehicle comprises front and rear substrates, with the front substrate having a perimeter edge region comprising a first cutout region and a first connecting tab and the rear substrate having a perimeter edge region comprising a second cutout region and a second connecting tab. The first connecting tab extends beyond a perimeter edge of the second cutout region of the rear substrate and the second connecting tab extends beyond a perimeter edge of the first cutout region of the front substrate. The first connecting tab facilitates electrical connection to the transparent conductive coating of the second surface of the front substrate and the second connecting tab facilitates electrical connection to the conductive coating of the third surface of the rear substrate.

Optionally, the mirror assembly may include an information display, such as a video display screen. The video display screen may be disposed rearward of and behind the reflective element assembly such that display information displayed by the video display screen is viewable by the driver of the vehicle through the reflective element, and optionally-through the transflective mirror reflector of the reflective element, when the mirror assembly is normally mounted in a vehicle.

These and other objects, advantages, purposes and features of the present invention will become apparent upon review of the following specification in conjunction with the drawings.

DESCRIPTION OF THE PREFERRED EMBODIMENTS

Figure 1:
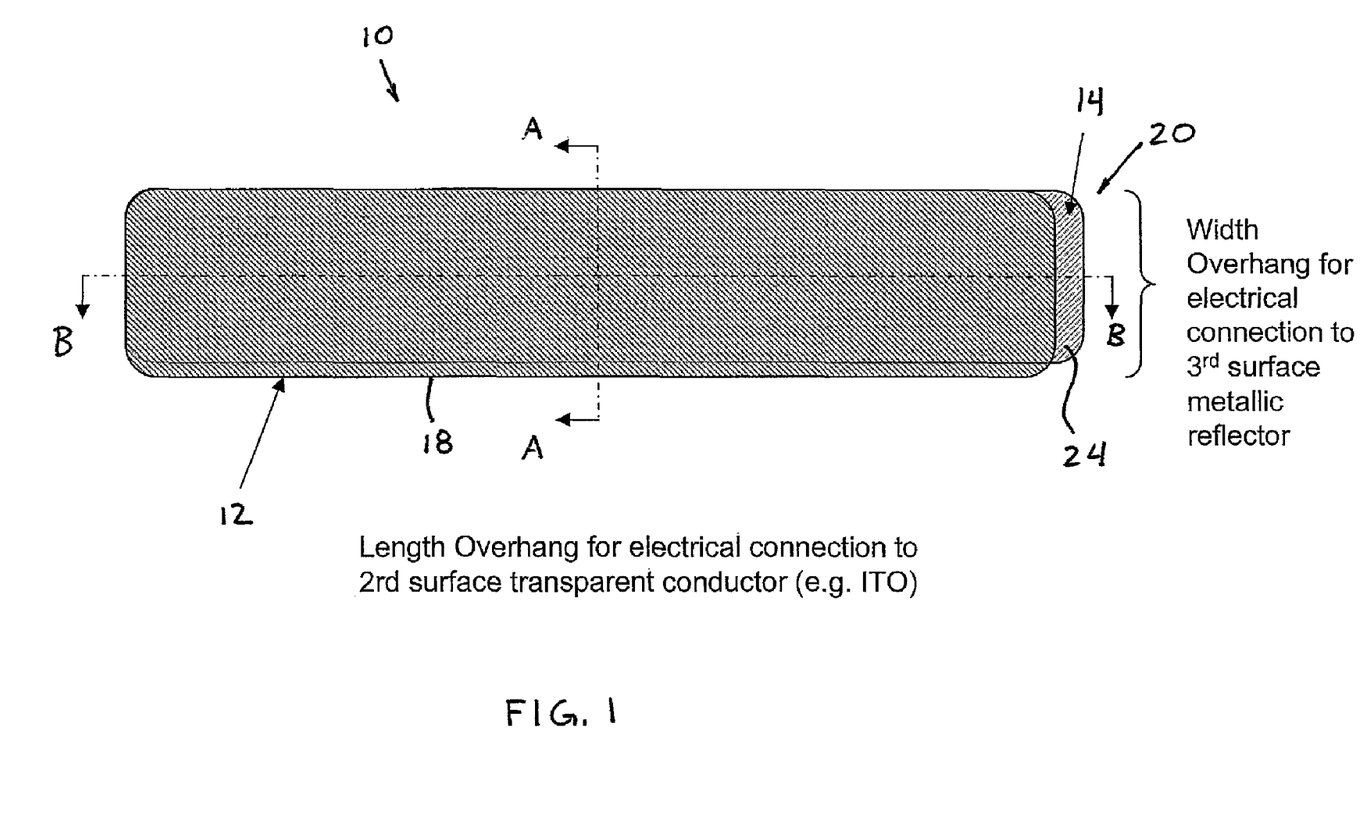
FIG. 1 is a plan view of an interior rearview mirror and display in accordance with the present invention.
Figure 1A:
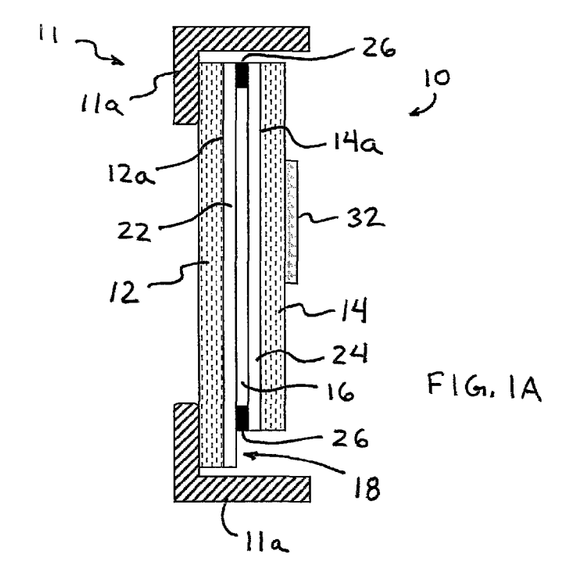
FIG. 1A is a sectional view of the interior rearview mirror taken along the line A-A in FIG. 1.
Figure 1B:
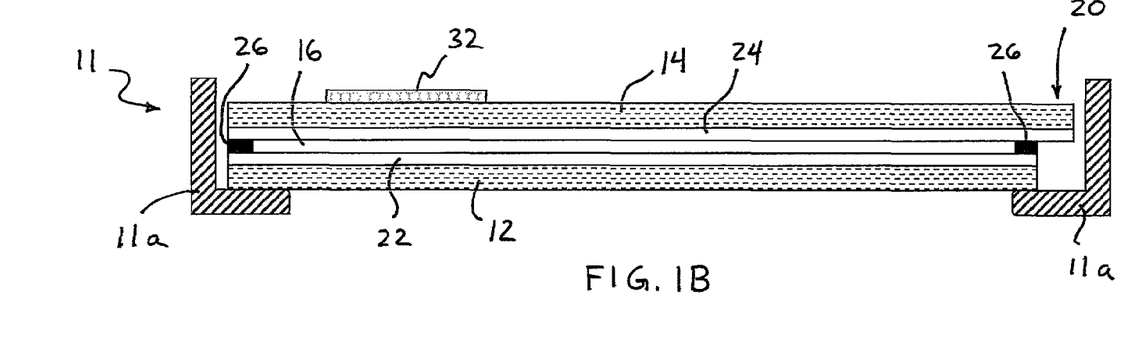
FIG. 1B is a sectional view of the interior rearview mirror taken along the line B-B in FIG. 1.

Referring now to the drawings and the illustrative embodiments depicted therein, a rearview mirror system includes an electro-optic reflective element assembly 10 (such as for an interior rearview mirror assembly) having a front substrate 12 and a rear substrate 14 and an electro-optic medium 16, such as an electrochromic medium or the like, sandwiched therebetween (FIGS. 1, 1A and 1B). The front substrate 12 is formed to have a cross dimension that is greater than a corresponding cross dimension of the rear substrate so as to establish a first overhang or connecting region 18 for establishing electrical connection to the front substrate, while the rear substrate 14 is formed to have a cross dimension that is greater than a corresponding cross dimension of the front substrate so as to establish a second overhang or connecting region 20 for establishing electrical connection to the rear substrate, as discussed below.

In the illustrated embodiment, the front substrate 12 comprises a transparent glass substrate having a transparent conductive coating 22 established over its rear surface 12a (the surface opposing the electro-optic medium, commonly referred to as the second surface of the mirror assembly), while the rear substrate 14 comprises a transparent glass substrate having a conductive coating 24 (such as a metallic reflective or transflective conductive coating for a third surface reflector or such as a transparent conductive coating for a fourth surface reflector) established over its front surface 14a (the surface opposing the electro-optic medium, commonly referred to as the third surface of the mirror assembly). The electro-optic medium is established between the front and rear substrates and in a cavity sealed by a perimeter seal 26 disposed around the perimeter of the principal reflecting region of the mirror assembly.

The perimeter seal 26 is disposed between the front and rear substrates and spaces the front and rear substrates apart and forms an interpane cavity therebetween. The electro-optic medium 16, such as an electrochromic medium, is disposed in the interpane cavity established between the third surface 14a of the rear substrate 14 and the second surface 12a of the front substrate 12 and bounded by the perimeter seal 26. The electro-optic medium 16 contacts the transparent conductive coating or layer 22 at the second surface of the front substrate and the conductive layer 24, such as a metallic layer or layers or such as a transflective metallic reflector or the like, at the third surface of the rear substrate The electro-optic medium 16 is electrically darkened to dim or reduce the reflectivity of the reflective element assembly by applying an electrical current to the conductive coatings 22, 24 on the front and rear substrates via electrical connections made thereto. In the illustrated embodiment, the vertical cross dimension or height dimension of the front substrate 12 is greater than the height dimension of the rear substrate 14 so that when the upper edges of the front and rear substrates are substantially aligned or flush with one another, the lower edge region of the front substrate 12 extends beyond the lower edge region of the rear substrate 14. The lower edge region of the front substrate 12 thus establishes an overhang region or connecting tab 18 (FIGS. 1 and 1A) for facilitating electrical connection to the transparent conductor 22 at rear surface 12a of front substrate 12, such as via an electrical clip or the like. Likewise, the lateral cross dimension or width dimension of the rear substrate 14 may be greater than the lateral cross dimension of the front substrate 12 so that when one of the side perimeter edges of the front and rear substrates are substantially aligned or flush with one another, the other side edge region of the rear substrate 14 extends beyond the corresponding side edge region of the front substrate 12. The side edge region of the rear substrate 14 thus establishes an overhang region or connecting tab 20 (FIGS. 1 and 1B) for facilitating electrical connection to the conductor 24 at front surface 14a of rear substrate 14, such as via an electrical clip or the like.

Thus, the reflective element assembly 10 provides isolated connecting tabs or regions 18, 20 for establishing the electrical connection to the respective conductive coating or coatings 22, 24. The reflective element assembly 10 thus provides for enhanced electrical connection to the conductive coatings while providing a reduced height profile of the reflective element assembly and thus a reduced overall height of the assembled mirror as installed in the vehicle.

Optionally, and as shown in FIGS. 1A and 1B, the interior mirror assembly 11 may include the reflective element assembly 10 and a display element or display screen 32. The mirror assembly includes a bezel and/or casing portion 11a that supports the reflective element, which may be configured for use with the display element or display screen 32 or the like disposed at the rear of the reflective element and operable to project or emit illumination or display information through the reflective element assembly for viewing by the driver of the vehicle when the mirror assembly is normally installed in the vehicle. The reflective element assembly may include a window established through the third surface reflector 24 at the display area or the third surface reflector 24 may comprise a transflective reflector that is partially reflectant of light incident thereon and is partially transmissive of at least the light emitted by the display element disposed to the rear of the reflective element assembly.

The reflective element assembly 10 may comprise an electrically variable reflectance mirror reflector, such as an electro-optic reflective element assembly or cell, such as an electrochromic reflective element assembly or cell. For example, the reflective element assembly may comprise an electro-optic or electrochromic reflective element or cell, such as an electrochromic mirror assembly and electrochromic reflective element utilizing principles (including transflective principles) disclosed in commonly assigned U.S. Pat. Nos. 7,370,983; 7,338,177; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; 4,824,221; 5,818,636; 6,166,847; 6,111,685; 6,392,783; 6,710,906; 6,798,556; 6,554,843; 6,420,036; 5,142,406; 5,442,478; and/or 4,712,879, and/or 4,712,879, and/or U.S. patent application Ser. No. 10/538,724, filed Jun. 13, 2005 by Hutzel et al.; and/or Ser. No. 11/226,628, filed Sep. 14, 2005 by Karner et al., and/or International Pat. Publication Nos. WO 2004/098953, published Nov. 18, 2004; WO 2004/042457, published May 21, 2004; WO 2003/084780, published Oct. 16, 2003; and/or WO 2004/026633, published Apr. 1, 2004, which are all hereby incorporated herein by reference in their entireties, and/or such as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated herein by reference in their entireties.

Although shown and described as being a reflective element assembly for an interior rearview mirror assembly, it is envisioned that aspects of the reflective element assembly 10 may be suitable for exterior mirror applications, while remaining within the spirit and scope of the present invention. Optionally, the mirror reflective element may comprise a frameless reflective element, such as by utilizing aspects of the reflective elements described in U.S. Pat. Nos. 7,184,190;

7,255,451; 7,274,501; and/or 7,360,932, and/or PCT Application No. PCT/US2006/018567, filed May 15, 2006 by Donnelly Corp. et al.; PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772; and/or U.S. patent application Ser. No. 11/912,576, filed Oct. 25, 2007; Ser. No. 11/226,628, filed Sep. 14, 2005; and/or Ser. No. 10/538,724, filed Jun. 13, 2005, which are hereby incorporated herein by reference in their entireties. Optionally, the reflective element may include a metallic perimeter band around the perimeter of the reflective element, such as by utilizing aspects of the reflective elements described in U.S. Pat. No. 7,255,451, and/or PCT Application No. PCT/US2006/018567, filed May 15, 2006 by Donnelly Corp. et al.; PCT Application No. PCT/US03/29776, filed Sep. 19, 2003 by Donnelly Corp. et al. for ELECTROCHROMIC MIRROR ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. patent application Ser. No. 11/912,576, filed Oct. 25, 2007; and/or Ser. No. 11/226,628, filed Sep. 14, 2005 by Kamer et al. for MOUNTING ASSEMBLY FOR VEHICLE INTERIOR MIRROR, which are hereby incorporated herein by reference in their entireties. The frameless reflective element thus is aesthetically pleasing to a person viewing the mirror assembly, since the reflective element (as recessed or partially recessed in the opening of the bezel portion of the mirror casing) does not include a separate frame or bezel portion around its perimeter edge. The metallic perimeter band may be selected to have a desired color or tint to match or contrast a color scheme or the like of the vehicle, such as described in PCT Application No. PCT/US2006/018567, filed May 15, 2006 by Donnelly Corp. et al.; and/or PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772, and/or U.S. patent application Ser. No. 11/912,576, filed Oct. 25, 2007, which are hereby incorporated herein by reference in their entireties.

Optionally, use of an elemental semiconductor mirror, such as a silicon metal mirror, such as disclosed in U.S. Pat. Nos. 7,338,177; 6,286,965; 6,196,688; 5,535,056; 5,751,489; and 6,065,840, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly.

Figure 2:
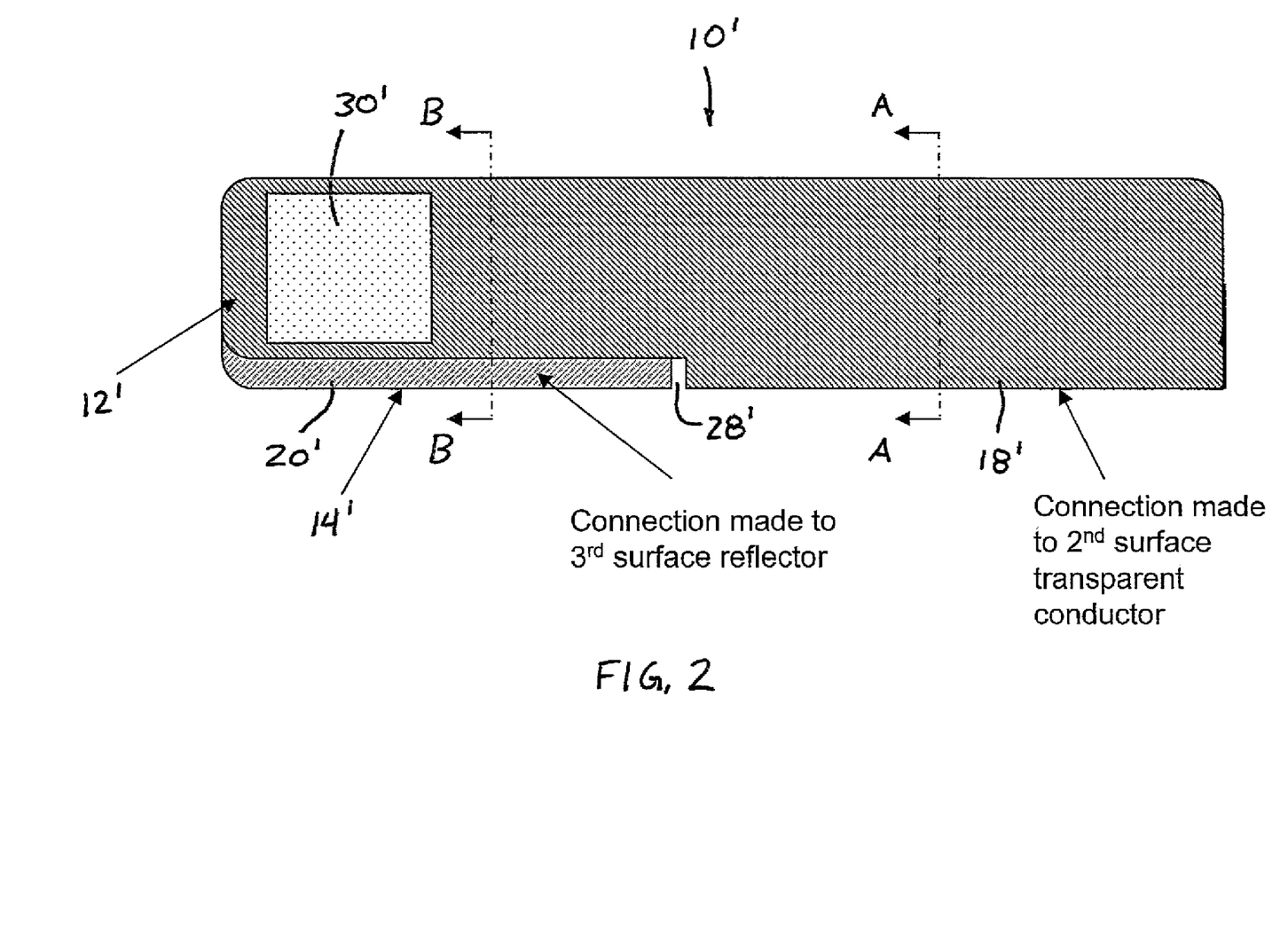
FIG. 2 is a plan view of another interior rearview mirror in accordance with the present invention.
Figure 2A:
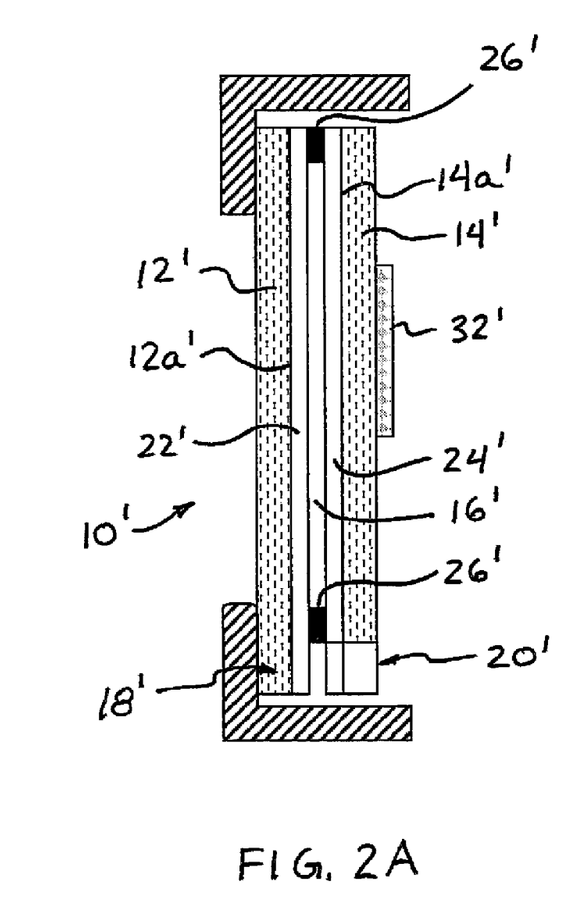
FIG. 2A is a sectional view of the interior rearview mirror taken along the line A-A in FIG. 2.
Figure 2B:
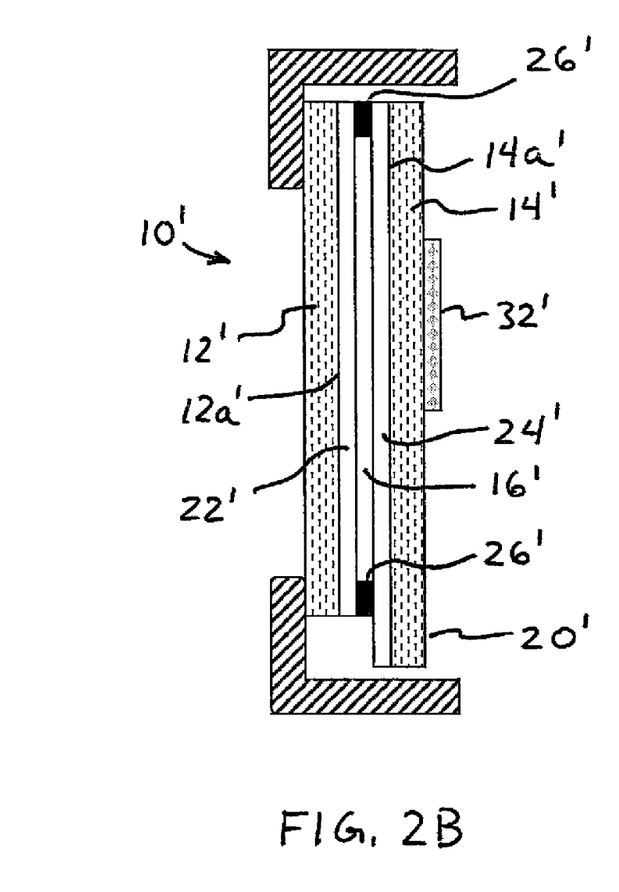
FIG. 2B is a sectional view of the interior rearview mirror taken along the line B-B in FIG. 2.

Optionally, and with reference to FIGS. 2, 2A and 2B, an electro-optic reflective element assembly 10' (such as for an interior rearview mirror assembly) may have a front substrate 12' and a rear substrate 14' and an electro-optic medium 16', such as an electrochromic medium or the like, sandwiched therebetween, with the front substrate 12' formed to have a first tab portion or overhang or connecting region 18' (FIGS. 2 and 2A) for establishing electrical connection to the front substrate and the rear substrate 14' formed to have a second tab portion or overhang or connecting region 20' (FIGS. 2 and 2B) for establishing electrical connection to the rear substrate.

In the illustrated embodiment, the front substrate 12' comprises a transparent glass substrate having a transparent conductive coating 22' established over its rear surface 12a' (the surface opposing the electro-optic medium, commonly referred to as the second surface of the mirror assembly), while the rear substrate 14' comprises a transparent glass substrate having a conductive coating 24' (such as a metallic reflective or transflective conductive coating for a third surface reflector or such as a transparent conductive coating for a fourth surface reflector) established over its front surface 14a' (the surface opposing the electro-optic medium, commonly referred to as the third surface of the mirror assembly). The electro-optic medium is established between the front and rear substrates and in a cavity sealed by a perimeter seal 26' disposed around the perimeter of the principal reflecting region of the mirror assembly.

In the illustrated embodiment, the vertical cross dimension or height dimension of a portion of the front substrate 12' (such as approximately half of the front substrate) is greater than the height dimension of the corresponding portion of the rear substrate 14' (and greater than the remaining portion of the front substrate) so that when the upper edges of the front and rear substrates are substantially aligned or flush with one another, the lower edge region or tab portion 18' of the front substrate 12' extends beyond the corresponding lower edge region of the rear substrate 14'. Likewise, the vertical cross dimension or height dimension of a portion of the rear substrate 14' (such as approximately half of the rear substrate) is greater than the height dimension of the corresponding portion of the front substrate 12' (and greater than the remaining portion of the rear substrate) so that when the upper edges of the front and rear substrates are substantially aligned or flush with one another, the lower edge region or tab portion 20' of the rear substrate 14' extends beyond the corresponding lower edge region of the front substrate 12'. The tab portion 18' of the front substrate 12' thus establishes an overhang region or connecting tab for facilitating electrical connection to the transparent conductor 22' at rear surface 12a' of front substrate 12', such as via an electrical clip or the like, while the tab portion 20' of the rear substrate 14' establishes an overhang region or connecting tab for facilitating electrical connection to the conductor 24' at front surface 14a' of rear substrate 14', such as via an electrical clip or the like.

Thus, the reflective element assembly 10' provides isolated connecting tabs or regions 18', 20' for establishing the electrical connection to the respective conductive coating or coatings 22', 24'. As can be seen in FIG. 2, the connecting tabs 18', 20' are established at and along separate or isolated lower perimeter edge regions or lower portions of the reflective element assembly so as to provide substantially isolated connecting tabs. In the illustrated embodiment, a gap 28' is established between the tabs when the reflective element is assembled to substantially electrically isolate the tabs from one another (although other isolation means, such as a non-conductive isolation element or the like, may be disposed between the tabs to electrically isolate the front substrate connecting tab from the rear substrate connecting tab).

The reflective element assembly 10' thus provides for enhanced electrical connection to the conductive coatings while providing a reduced height profile of the reflective element assembly and thus a reduced overall height of the assembled mirror as installed in the vehicle. Although shown as having each tab portion 18', 20' extending along the bottom or lower edge region of the reflective element assembly, it is envisioned that the tab portions may otherwise extend along the upper edge region or along one or both of the side regions of the reflective element assembly, depending on the particular application of the reflective element assembly. Also, although shown as having each tab portion extending about half the length of the reflective element assembly, it is envisioned that the tab portions may extend other distances along the perimeter edge region at which they are established depending on the particular application of the reflective element assembly.

Optionally, and as shown in FIGS. 2, 2A and 2B, the reflective element assembly 10' may be configured for use with a display element or display screen 32' or the like disposed at the rear of the reflective element and operable to project or emit illumination or display information through the reflective element for viewing by the driver of the vehicle when the mirror assembly is normally installed in the vehicle. The reflective element assembly may include a window 30' established through the third surface reflector 24' or the third surface reflector 24' may comprise a transflective reflector that is partially reflectant of light incident thereon and is partially transmissive of at least the light emitted by the display element disposed to the rear of the reflective element assembly.

The display element may comprise any suitable display element or device, such as, for example, a video display element or device or the like, and may be a display-on-demand or transflective type display or other display, such as by utilizing aspects of the displays described in U.S. Pat. Nos. 7,543,947; 7,494,231; 7,490,007; 7,370,983; 7,274,501; 7,255,451; 7,195,381; 7,184,190; 7,167,796; 6,690,268; 5,668,663 and/or 5,724,187, and/or U.S. patent application Ser. No. 10/538,724, filed Jun. 13, 2005 by Hutzel et al. for ACCESSORY SYSTEM FOR VEHICLE; Ser. No. 11/226,628, filed Sep. 14, 2005 by Kamer et al.; Ser. No. 11/912,576, filed Oct. 25, 2007; Ser. No. 11/861,904, filed Sep. 26, 2007; and/or Ser. No. 12/414,190, filed Mar. 30, 2009, and/or PCT Patent Application No. PCT/US2006/018567, filed May 15, 2006 by Donnelly Corp. et al., and/or U.S. provisional application Ser. No. 61/105,903, filed Oct. 16, 2008; Ser. No. 61/117,301, filed Nov. 24, 2008; and/or Ser. No. 61/180,257, filed May 21, 2009, which are all hereby incorporated herein by reference in their entireties, or may include or incorporate video displays or the like, such as the types described in U.S. Pat. Nos. 7,370,983; 7,274,501; 7,255,451; 7,184,190; and/or 6,690,268 and/or U.S. patent application Ser. No. 10/538,724, filed Jun. 13, 2005; and/or Ser. No. 12/091,525, filed Apr. 25, 2008, and/or PCT Application No. PCT/US2006/042718, filed Oct. 31, 2006; and U.S. provisional application Ser. No. 60/836,219, filed Aug. 8, 2006; Ser. No. 60/759,992, filed Jan. 18, 2006; and/or Ser. No. 60/732,245, filed Nov. 1, 2005, which are hereby incorporated herein by reference in their entireties. Optionally, the mirror assembly may include a video display that is selectively positionable, such as extendable/retractable or pivotable or foldable so as to be selectively positioned at a side or below the mirror casing when in use and storable within or at least partially within the mirror casing when not in use. The display may be automatically activated and/or may automatically extend/pivot to an in-use position in response to an actuating event, such as when the playback device is activated (and/or optionally, when the display is associated with a rearward vision system or back up aid, when the vehicle is shifted into its reverse gear).

Optionally, for example, the display may comprise a 3.5 inch (or larger or smaller depending on the particular application) touch screen and/or video display. For example, the display may comprise a backlit video display such as the types described in U.S. Pat. No. 7,370,983, and/or U.S. patent application Ser. No. 10/538,724, filed Jun. 13, 2005; and/or Ser. No. 12/091,525, filed Apr. 25, 2008; and/or PCT Application No. PCT/US2006/042718, filed Oct. 31, 2006, which are hereby incorporated herein by reference in their entireties, and/or may utilize aspects of the displays and/or touch screens described in; and/or Ser. No. 12/414,190, filed Mar. 30, 2009, which is hereby incorporated herein by reference in its entirety. Optionally, the intensity of the display may be automatically adjusted to automatically dim the backlighting of the display element, such as in response to a photo sensor at the mirror assembly. The intensity of the display may thus be increased when the photo sensor senses an increase in ambient lighting so that the user may readily view and discern the display in high ambient lighting conditions, such as a sunny day, and may be decreased when the photo sensor senses a decrease in ambient lighting so that the display is not too bright in low lighting conditions to avoid being a distraction to the driver of the vehicle.

Optionally, the display may be operable to display information for viewing by the driver of the vehicle and also to display information or video for viewing by the passenger of the vehicle. For example, the output of the docking station that is received by the receiver at the mirror assembly may include video data (such as a movie or the like that is played by the playback device) for viewing by the passenger of the vehicle while the driver is driving the vehicle. Thus, the display may be configured such that the video is viewable by the passenger but substantially or principally not viewable by the driver of the vehicle (while other information, such as the selection menus and the like, may be viewed by the driver of the vehicle). The display may include louvers or microlouvers (such as described in U.S. Pat. Nos. 4,764,410; 4,766,023; 4,906,085; 5,254,388; 5,303,322; 5,313,335; and 5,481,409, and/or PCT Application No. PCT/US2006/018567, filed May 15, 2006 by Donnelly Corp. et al., and/or PCT Application No. PCT/US2006/042718, filed Oct. 31, 2006; and/or U.S. patent application Ser. No. 12/091,525, filed Apr. 25, 2008; and/or Ser. No. 11/912,576, filed Oct. 25, 2007, which are hereby incorporated herein by reference in their entireties), such as at a video display portion of the display to direct the video display toward the passenger side (and may be downward as well) to enhance viewing of the video display by a person sitting in the front passenger seat of the vehicle, while another display portion includes louvers or microlouvers that direct the menu information at the other display portion toward the driver of the vehicle for viewing by the driver.

Changes and modifications to the specifically described embodiments may be carried out without departing from the principles of the present invention, which is intended to be limited only by the scope of the appended claims as interpreted according to the principles of patent law.

The invention claimed is:

1. A reflective element assembly for an interior rearview mirror of a vehicle, said reflective element assembly comprising:
    a front substrate having a first surface and a second surface opposite said first surface, said second surface having a transparent conductive layer established thereat;
    a rear substrate having a third surface and a fourth surface opposite said third surface, said third surface having a conductive layer established thereat;

a perimeter seal disposed between said front and rear substrates, said perimeter seal spacing said front and rear substrates apart and forming an interpane cavity therebetween;

an electro-optic medium disposed in said interpane cavity established between said third surface of said rear substrate and said second surface of said front substrate and bounded by said perimeter seal, and wherein said electro-optic medium contacts said transparent conductive layer at said second surface of said front substrate and said conductive layer at said third surface of said rear substrate;

a first cross dimension of said front substrate being greater than a corresponding cross dimension of said rear substrate so as to establish a first connecting tab of said front substrate, said first connecting tab extending beyond a corresponding edge region of said rear substrate;

a second cross dimension of said rear substrate being greater than a corresponding cross dimension of said front substrate so as to establish a second connecting tab of said rear substrate, said second connecting tab extending beyond a corresponding edge region of said front substrate;

wherein one of said first and second cross dimensions comprises a generally vertical width dimension of said substrates when said reflective element assembly is normally mounted in a vehicle, and wherein another of said first and second cross dimensions comprises a generally horizontal length dimension of said substrates when said reflective element assembly is normally mounted in a vehicle; and said first connecting tab facilitating electrical connection to said transparent conductive coating of said second surface of said front substrate and said second connecting tab facilitating electrical connection to said conductive coating of said third surface of said rear substrate.

2. The reflective element assembly of claim 1, wherein said first cross dimension comprises a generally vertical width dimension of said front substrate and said second cross dimension comprises a generally horizontal length dimension of said rear substrate.

3. The reflective element assembly of claim 2, wherein said first connecting tab comprises a lower perimeter edge region of said front substrate.

4. The reflective element assembly of claim 3, wherein said second connecting tab comprises a side perimeter edge region of said rear substrate.

5. The reflective element assembly of claim 1, wherein said conductive layer at said third surface of said rear substrate comprises a transflective mirror reflector that is partially transmissive of light incident at a rear of said reflective element assembly and that is partially reflective of light incident at a front of said reflective element assembly.

6. The reflective element assembly of claim 5, wherein a display device is disposed behind said reflective element assembly and is operable to display information through said transflective mirror reflector for viewing by a driver of the vehicle when said reflective element assembly is normally mounted in the vehicle.

7. A reflective element assembly for an interior rearview mirror of a vehicle, said reflective element assembly comprising:

a front substrate having a first surface and a second surface opposite said first surface, said second surface having a transparent conductive layer established thereat;

a rear substrate having a third surface and a fourth surface opposite said third surface, said third surface having a conductive layer established thereat;

a perimeter seal disposed between said front and rear substrates, said perimeter seal spacing said front and rear substrates apart and forming an interpane cavity therebetween;

an electro-optic medium disposed in said interpane cavity established between said third surface of said rear substrate and said second surface of said front substrate and bounded by said perimeter seal, and wherein said electro-optic medium contacts said transparent conductive layer at said second surface of said front substrate and said conductive layer at said third surface of said rear substrate;

said front substrate having a perimeter edge region comprising a first cutout region and a first connecting tab;

said rear substrate having a perimeter edge region comprising a second cutout region and a second connecting tab;

wherein said first connecting tab extends beyond a perimeter edge of said second cutout region of said rear substrate and wherein said second connecting tab extends beyond a perimeter edge of said first cutout region of said front substrate; and said first connecting tab facilitating electrical connection to said transparent conductive coating of said second surface of said front substrate and said second connecting tab facilitating electrical connection to said conductive coating of said third surface of said rear substrate.

8. The reflective element assembly of claim 7, wherein said first connecting tab extends outboard of said perimeter seal at a first portion of a perimeter region of said reflective element assembly, and wherein said second connecting tab extends outboard of said perimeter seal at a second portion of said perimeter region of said reflective element assembly, said first and second portions of said perimeter region being spaced from one another.

9. The reflective element assembly of claim 7, wherein said first connecting tab and said first cutout region are at least partially along a lower perimeter edge region of said front substrate and said second connecting tab and said second cutout region are at least partially along a lower perimeter region of said rear substrate.

10. The reflective element assembly of claim 9, wherein said first and second connecting tabs extend partially along separate portions of said lower perimeter edge regions of said front and rear substrates so as to provide substantially isolated connecting tabs.

11. The reflective element assembly of claim 7, wherein said conductive layer at said third surface of said rear substrate comprises a transflective mirror reflector that is partially transmissive of light incident at a rear of said reflective element assembly and that is partially reflective of light incident at a front of said reflective element assembly.

12. The reflective element assembly of claim 11, wherein a display device is disposed behind said reflective element assembly and is operable to display information through said transflective mirror reflector for viewing by a driver of the vehicle when said reflective element assembly is normally mounted in the vehicle.

13. An interior rearview mirror assembly for a vehicle, said interior rearview mirror assembly comprising:

a reflective element assembly;

wherein said reflective element assembly comprises a front substrate having a first surface and a second surface opposite said first surface, said second surface having a transparent conductive layer established thereat;

wherein said reflective element assembly comprises a rear substrate having a third surface and a fourth surface opposite said third surface, said third surface having a transflective mirror reflector established thereat, wherein said transflective mirror reflector is partially transmissive of light incident at a rear of said reflective element assembly and is partially reflective of light incident at a front of said reflective element assembly;

wherein said reflective element assembly comprises a perimeter seal disposed between said front and rear substrates, said perimeter seal spacing said front and rear substrates apart and forming an interpane cavity therebetween;

wherein said reflective element assembly comprises an electro-optic medium disposed in said interpane cavity established between said third surface of said rear substrate and said second surface of said front substrate and bounded by said perimeter seal, and wherein said electro-optic medium contacts said transparent conductive layer at said second surface of said front substrate and said transflective mirror reflector at said third surface of said rear substrate;

wherein said front substrate has a first cross dimension that is greater than a corresponding cross dimension of said rear substrate so as to establish a first connecting tab of said front substrate, said first connecting tab extending beyond a corresponding edge region of said rear substrate;

wherein said rear substrate has a second cross dimension that is greater than a corresponding cross dimension of said front substrate so as to establish a second connecting tab of said rear substrate, said second connecting tab extending beyond a corresponding edge region of said front substrate;

wherein one of said first and second cross dimensions comprises a generally vertical width dimension of said substrates when said reflective element assembly is normally mounted in a vehicle, and wherein another of said first and second cross dimensions comprises a generally horizontal length dimension of said substrates when said reflective element assembly is normally mounted in a vehicle;

said first connecting tab facilitating electrical connection to said transparent conductive coating of said second surface of said front substrate and said second connecting tab facilitating electrical connection to said conductive coating of said third surface of said rear substrate; and a display device disposed behind said reflective element assembly and operable to display information through said transflective mirror reflector for viewing by a driver of the vehicle when said reflective element assembly is normally mounted in the vehicle.

14. The interior rearview mirror assembly of claim 13, wherein said first cross dimension comprises a generally vertical width dimension of said front substrate and said second cross dimension comprises a generally horizontal length dimension of said rear substrate.

15. The interior rearview mirror assembly of claim 14, wherein said first connecting tab comprises a lower perimeter edge region of said front substrate.

16. The interior rearview mirror assembly of claim 15, wherein said second connecting tab comprises a side perimeter edge region of said rear substrate.

* * * * *

UNITED STATES PATENT AND TRADEMARK OFFICE
CERTIFICATE OF CORRECTION

| | |
|---|---|
| PATENT NO. | : 7,813,023 B2 |
| APPLICATION NO. | : 12/480331 |
| DATED | : October 12, 2010 |
| INVENTOR(S) | : Michael J. Baur |

It is certified that error appears in the above-identified patent and that said Letters Patent is hereby corrected as shown below:

Column 5
Line 23, "Kamer" should be --Karner--

Column 7
Line 38, "Kamer" should be --Karner--
Line 43, "application" should be --applications--
Line 52, "application" should be --applications--

Column 8
Line 6, "application" should be --applications--
Line 42, "application" should be --applications--

Signed and Sealed this
Fifteenth Day of November, 2011

David J. Kappos
*Director of the United States Patent and Trademark Office*